(12) United States Patent
Lee et al.

(10) Patent No.: US 12,189,983 B2
(45) Date of Patent: Jan. 7, 2025

(54) STORAGE DEVICE INCLUDING STORAGE CONTROLLER PROCESSING COMMAND IN WHICH SEPARATE COMMANDS ARE MERGED AND OPERATING METHOD THEREOF

(71) Applicant: SK hynix Inc., Gyeonggi-do (KR)

(72) Inventors: Taek Gyu Lee, Gyeonggi-do (KR); Byung Jun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/498,046

(22) Filed: Oct. 31, 2023

(65) Prior Publication Data

US 2024/0393976 A1    Nov. 28, 2024

(30) Foreign Application Priority Data

May 26, 2023   (KR) .................. 10-2023-0068283

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 11,275,527 B1* | 3/2022 | Spector | G06F 13/1642 |
| 2015/0295859 A1* | 10/2015 | Yuan | H04L 61/58 370/401 |
| 2020/0319861 A1* | 10/2020 | Lacey | G06F 8/453 |
| 2023/0325120 A1* | 10/2023 | Ayyapureddi | G06F 3/0659 711/154 |

FOREIGN PATENT DOCUMENTS

| | | |
|---|---|---|
| KR | 10-2022-0102540 A | 7/2022 |
| KR | 10-2023-0011214 A | 1/2023 |

* cited by examiner

*Primary Examiner* — Tracy C Chan
(74) *Attorney, Agent, or Firm* — IP & T GROUP LLP

(57) ABSTRACT

A storage device includes: a non-volatile memory device; and a storage controller for receiving a first Protocol Information unit (PIU) including a first merge message from an external device, and performing, based on the first PIU, at least one of a sense operation of reading first data stored in a memory block of the non-volatile memory device and a select operation of storing, in the memory block, second data received from the external device. The first PIU includes a basic header segment commonly included in PIUs transmitted/received between the external device and the storage controller, and a first Extra Header Segment (EHS) including the first merge message.

17 Claims, 10 Drawing Sheets

FIG. 6

| Extra Header Segment (63) | | | |
|---|---|---|---|
| 0 Length | 1 EHSType | 2 EHSSubType | 3 |
| 4 EHS data | | | N |

STORAGE DEVICE INCLUDING STORAGE CONTROLLER PROCESSING COMMAND IN WHICH SEPARATE COMMANDS ARE MERGED AND OPERATING METHOD THEREOF

CROSS-REFERENCE TO RELATED APPLICATION

The present application claims priority under 35 U.S.C. § 119 (a) to Korean patent application number 10-2023-0068283 filed on May 26, 2023, the entire disclosure of which is incorporated by reference herein.

BACKGROUND

1. Field of Invention

Embodiments of the present disclosure generally relate to a storage controller, and more particularly, to a storage device including a storage controller processing commands and an operating method thereof.

2. Description of Related Art

A storage device is a device which stores data according to a request from a host device such as a computer or a smart phone. The storage device may include a memory device for storing data and a memory controller for controlling the memory device. The memory device may be a volatile memory device or a nonvolatile memory device.

The storage device may communicate with the host device, using data packets referred to as protocol information units. A plurality of protocol information units configured in a pair are used to perform an operation on all pages.

SUMMARY

Embodiments of the present disclosure provide a storage device capable of processing a command in which separate commands are merged.

In accordance with one aspect of the present disclosure, there is provided a storage device including: a non-volatile memory device; and a storage controller configured to receive a first Protocol Information unit (PIU) including a first merge message from an external device, and perform, based on the first PIU, at least one of a sense operation of reading first data stored in a memory block of the non-volatile memory device and a select operation of storing, in the memory block, second data received from the external device, wherein the first PIU includes: a basic header segment; and a first Extra Header Segment (EHS) including the first merge message.

In accordance with another aspect of the present disclosure, there is provided method of operating a storage controller, the method including: receiving a first Protocol Information Unit (PIU) including a first merge message from an external device; acquiring first data from the first merge message; storing, in a non-volatile memory device, the first data received from the external device; and reading second data stored in the non-volatile memory device, wherein the first merge message includes a merge Extra Header Segment (EHS) type.

In accordance with another aspect of the present disclosure, there is provided a storage device including: a non-volatile memory device including at least a device data block; and a storage controller including: a Protocol Information unit (PIU) parser configured to receive, from an external device, a first PIU including a first merge message as a first Extra Header Segment (EHS), and acquire the first merge message by parsing the received first PIU; a PIU processor configured to perform, based on the first PIU, a sense operation of reading first data stored in a device data block of the non-volatile memory device, a select operation of storing, in the device data block, second data received from the external device, or both the select operation and the sense operation; and a PIU generator configured to generate a second merge message according to the first merge message, and transmit a second PIU including the second merge message to the external device, wherein the second merge message includes a merge EHS type, first status data indicating that the select operation has succeeded, second status data indicating that the sense operation has succeeded, and the second data.

BRIEF DESCRIPTION OF THE DRAWINGS

Embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 6 is a diagram illustrating a structure of an extra header segment of a PIU.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Further, terms including "unit," "module," and the like, which are used herein, refer to units which perform at least one function or operation, and the unit, the module, and the like may be implemented as hardware, software, or a combination of hardware and software. Detailed descriptions of overlapping components will be omitted to clarify the scope of the present disclosure.

Figure 1:
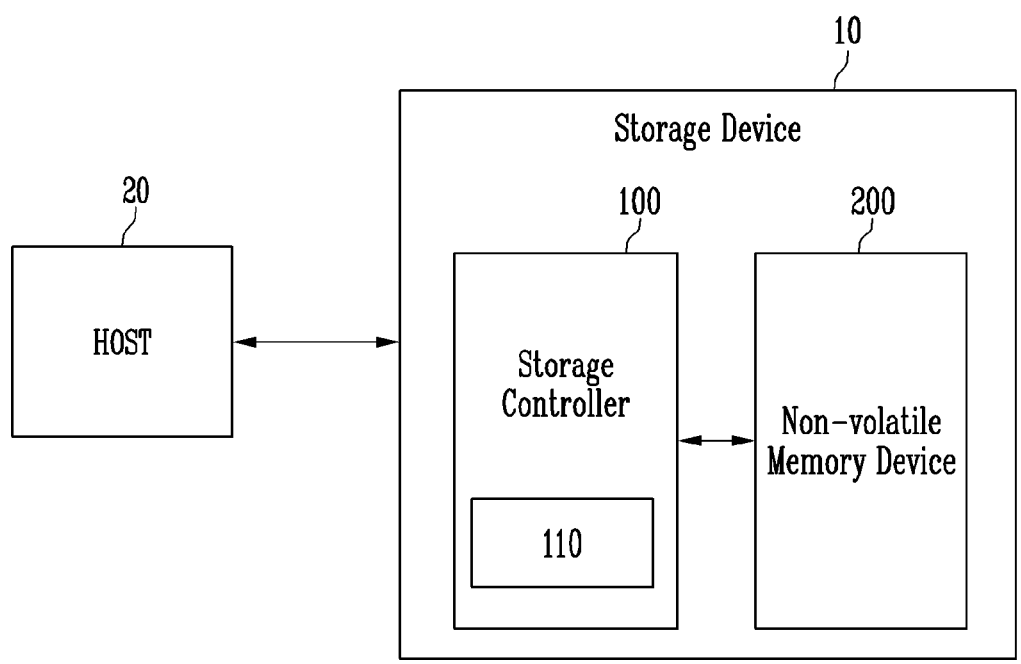
FIG. 1 is a block diagram illustrating a storage system in accordance with one embodiment of the present disclosure.

FIG. 1 is a block diagram illustrating a storage system in accordance with one embodiment of the present disclosure.

Referring to FIG. 1, the storage system may include a storage device 10 and a host 20 (i.e., an external device). In some embodiments, the storage system may be a computing system configured to process various pieces of information, such as for example a personal computer (PC), a notebook computer, a laptop computer, a sever, a workstation, a tablet PC, a smartphone, a digital camera, or a black box.

The host 20 may control general operations of the storage system. In some embodiments, the host 20 may control a select operation, a sense operation, a first merge operation, a write operation, a read operation, and a second merge operation of the storage device 10.

The select operation may be an operation of storing a device medium variable received from the host 20 in the storage device 10. The sense operation may be an operation of reading a device medium variable stored in the storage device 10. That is, the sense operation may be an operation of transferring the device medium variable stored in the storage device 10 to the host 20. The first merge operation may be an operation of performing both the sense operation and the select operation.

The device medium variable may set a recording mode of a non-volatile memory device 200 included in the storage device 10. The select operation may be an operation of setting a recording mode of the storage device 10. The sense operation may be an operation of sensing a recording mode that is set for the storage device 10.

The write operation may be an operation of storing data received from the host 20 in the storage device 10. The read operation may be an operation of reading data stored in the storage device 10. That is, the read operation may be an operation of transferring the data stored in the storage device 10 to the host 20. The second merge operation may be an operation of performing both the write operation and the read operation.

The storage device 10 may include a storage controller 100 and the non-volatile memory device 200. The non-volatile memory device 200 may store data therein. The storage controller 100 may control the nonvolatile memory device 200 to store data in the nonvolatile memory device 200 or read out data stored in the non-volatile memory device 200 according to a request of the host 20.

In this disclosure, information transmitted/received between the host 20 and the storage controller 100 may be referred to as a request or a command. In some embodiments, the host 20 and the storage controller 100 may communicate with each other, using data packets referred to as Protocol Information Units (PIUs). A PIU may be a kind of data packet generated according to a predetermined standard. In some embodiments, the PIU may include a data header segment, a transaction specific field, an extra header segment, and a data segment. This will be described in more detail later with reference to FIG. 4.

The host 20 may communicate with the storage device 10, using at least one of various communication manners, such as for example a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The storage controller 100 may include a PIU management module 110. The PIU management module 110 may perform the sense operation, the select operation, and the first merge operation. Also, the PIU management module 110 may perform the write operation, the read operation, and the second merge operation. This will be described in more detail later with reference to FIGS. 5, 7 and 8.

In some embodiments, the non-volatile memory device 200 may be a NAND flash memory, but the scope of the present disclosure is not limited thereto. The non-volatile memory device 200 may be one of various storage devices capable of retaining stored data even when power supply is interrupted, such as for example a Phase-change Random Access Memory (PRAM), a Magnetic Random Access Memory (MRAM), a Resistive Random Access Memory (RRAM), and a Ferroelectric Random Access Memory (FRAM). The non-volatile memory device 200 may include a device data block and a normal data block. The device data block may include a device medium variable of the non-volatile memory device 200. The normal data block may include normal data stored by using a recording mode which is set according to a device medium variable. In some embodiments, the normal data may be user data.

Figure 2:
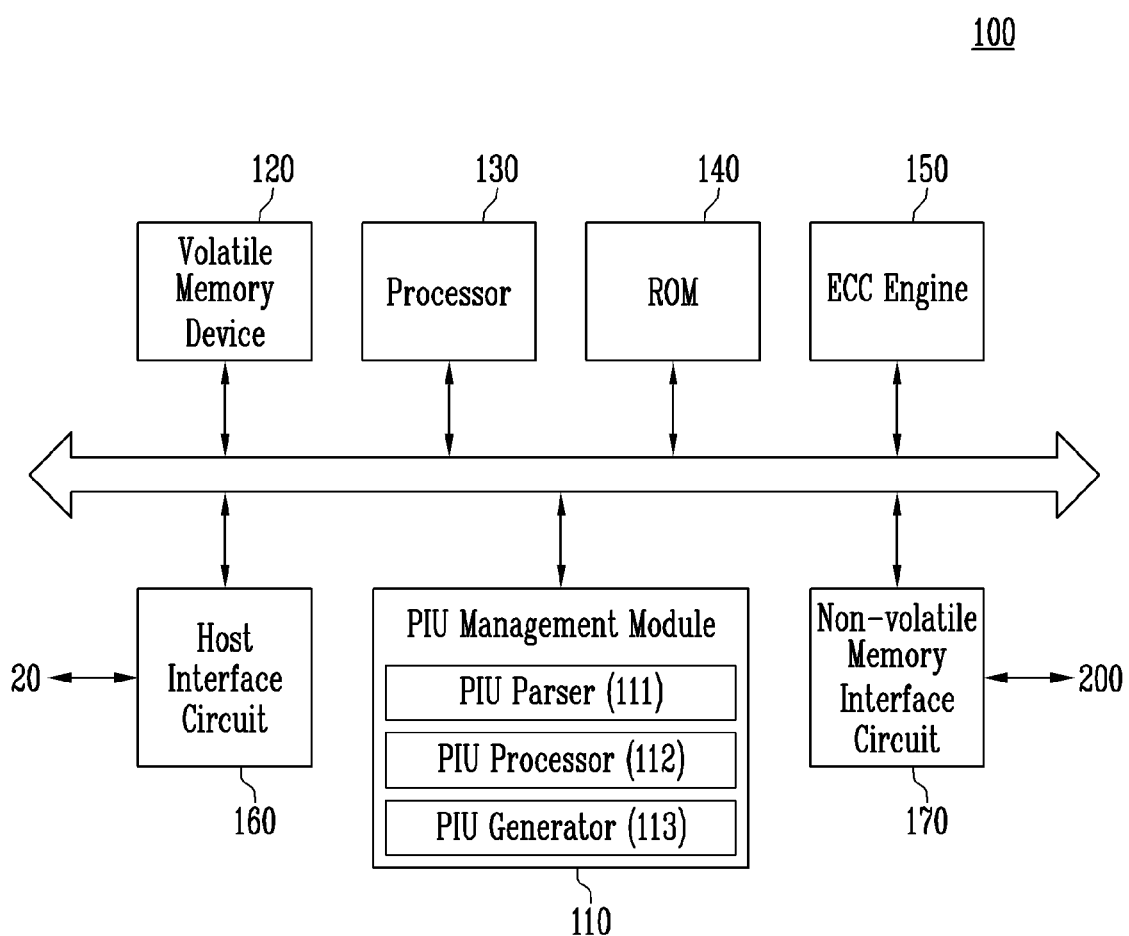
FIG. 2 is a block diagram illustrating in detail a storage controller shown in FIG. 1 in accordance with another embodiment of the present disclosure.

FIG. 2 is a block diagram illustrating in detail the storage controller 100 shown in FIG. 1 in accordance with another embodiment of the present disclosure.

Referring to FIG. 2, the storage controller 100 may communicate with the host 20 and the non-volatile memory device 200. The storage controller 100 may include the PIU management module 110, a volatile memory device 120, a processor 130, a Read Only Memory (ROM) 140, an Error Correction Code (ECC) engine 150, a host interface circuit 160, and a non-volatile memory interface circuit 170.

The PIU management module 110 may include a PIU parser 111, a PIU processor 112, and a PIU generator 113. In some embodiments, the PIU management module 110 may be implemented as software or firmware. For example, the non-volatile memory device 200 may store commands corresponding to the PIU management module 110. The processor 130 may load the commands of the non-volatile memory device 200 to the volatile memory device 120. The processor 130 may execute the loaded commands to operate the PIU management module 110.

The PIU parser 111 may parse a first PIU received from the host 20. The PIU parser 111 may acquire a first merge message by parsing the received first PIU. The first merge message may include a merge EHS (Extra Header Segment) type and an EHS sub-type. The merge EHS type may refer to a merge PIU in which separate PIUs are merged using an EHS field. That is, a PIU including the first merge message may be the merge PIU. The EHS sub-type may refer to an operation to be performed by a device receiving the merge PIU. For example, the EHS sub-type may include one or more of a select type, a sense type, a first merge type, a write type, a read type, and a second merge type.

The PIU processor 112 may perform an operation according to the EHS type. In addition, the first merge message may further include a device medium variable according to the EHS sub-type. For example, when the first merge message includes the select type and the device medium variable, the PIU processor 112 may store a device medium variable received from the host 20 in the non-volatile memory device 200. When the first merge message includes the sense type, the PIU processor 112 may read a device medium variable stored in the non-volatile memory device 200. When the first merge message includes the first merge type and the device medium variable, the PIU processor 112 may read the device medium variable stored in the non-volatile memory device 200, and store the device medium variable received from the host 20 in the non-volatile memory device 200.

The PIU generator 113 may generate a second PIU according to the first PIU. The second PIU may include a second merge message. The PIU generator 113 may generate the second merge message. The second merge message may include a merge EHS type, an EHS sub-type, and status data about whether an operation of the PIU processor has succeeded. Also, the second merge message may further include a device medium variable according to the EHS sub-type.

For example, when the PIU processor 112 successfully performs a select operation based on a select type, the second merge message may include a merge EHS type, the select type, and status data indicating that the select operation has succeeded. When the PIU processor 112 successfully performs a sense operation based on a sense type, the second merge message may include a merge EHS type, the sense type, status data indicating that the sense operation has succeeded, and a device medium variable stored in the non-volatile memory device 200. When the PIU processor 112 successfully performs a first merge operation based on a first merge type, the second merge message may include a merge EHS type, the first merge type, status data indicating that the select operation has succeeded, status data indicating that the sense operation has succeeded, and a device medium variable stored in the non-volatile memory device 200.

Although only the status data indicating that the select operation or the sense operation has succeeded is disclosed, the present disclosure is not limited thereto. For example, when the select operation fails, the second merge message may include status data indicating that the select operation has failed. Further, when the sense operation fails, the second merge message may include status data indicating that the sense operation has failed.

The volatile memory device 120 may be used as a main memory, a cache memory, and/or a working memory of the storage controller 100. For example, the volatile memory device 120 may be implemented as a Static Random Access Memory (SRAM), a Dynamic Random Access Memory (DRAM), or the like.

The processor 130 may control general operations of the storage controller 100. The ROM 140 may be used as a storage for storing information used for an operation of the storage controller 100. The ECC engine 150 may detect and correct an error in data read from the non-volatile memory device 200. For example, the ECC engine 150 may have an error correction ability of a certain level. The ECC engine 150 may determine, as uncorrectable data, data having an error level (e.g., a number of flipped bits) exceeding the error correction ability.

The storage controller 100 may communicate with the host 20 through the host interface circuit 160. In some embodiments, the host interface circuit 160 may be implemented based on at least one or more of various interfaces such for example as a serial ATA (SATA) interface, a Peripheral Component Interconnect express (PCIe) interface, a Serial Attached SCSI (SAS) interface, a Non-Volatile Memory express (NVMe) interface, and a Universal Flash Storage (UFS) interface.

The storage controller 100 may communicate with the non-volatile memory device 200 through the non-volatile memory interface circuit 170. In some embodiments, the non-volatile memory interface circuit 170 may be implemented based on a NAND interface.

Figure 3:
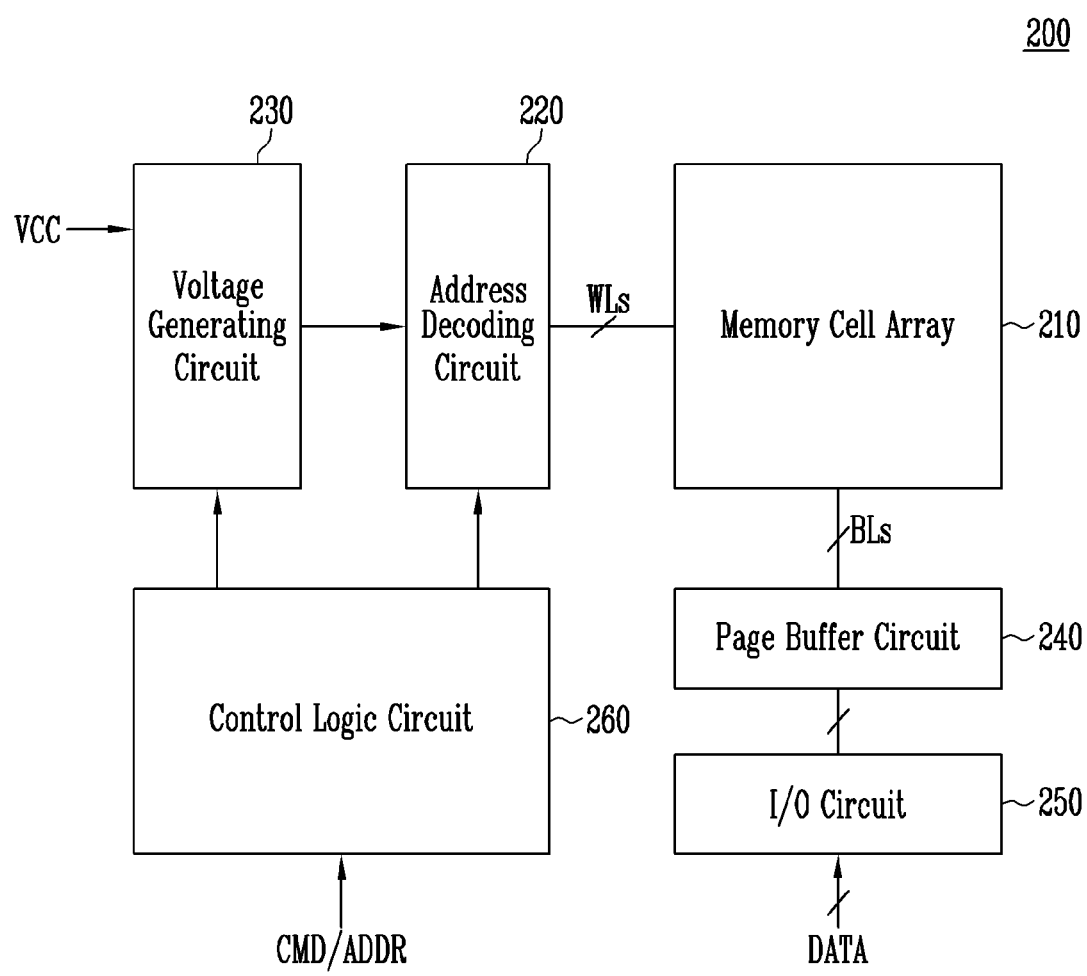
FIG. 3 is a block diagram illustrating in detail a non-volatile memory device shown in FIG. 1 in accordance with another embodiment of the present disclosure.

FIG. 3 is a block diagram illustrating in detail the non-volatile memory device 200 shown in FIG. 1 in accordance with another embodiment of the present disclosure.

In some embodiments, the non-volatile memory device 200 may be a NAND flash memory. However, the scope of the present disclosure is not limited thereto, and the non-volatile memory device 200 may be one or more of various types of memory devices such as for example a DRAM, an SRAM, a PRAM, an MRAM, an RRAM, and an FRAM.

Referring to FIG. 3, the non-volatile memory device 200 may include a memory cell array 210, an address decoding circuit 220, a voltage generating circuit 230, a page buffer circuit 240, an input/output (I/O) circuit 250, and a control logic circuit 260.

The memory cell array 210 may include a plurality of memory blocks. Each of the plurality of memory blocks may be connected to the address decoding circuit 220 through word lines WLs, and be connected to the page buffer circuit 240 through bit lines BLs. In some embodiments, the plurality of memory blocks may include a device data block and a normal data block.

Each of the plurality of memory blocks may include a plurality of memory cells. In an embodiment, the plurality of memory cells may be non-volatile memory cells. Memory cells connected to the same word line among the plurality of memory cells may be defined as one physical page. That is, the memory cell array 210 may include a plurality of physical pages. Each of the memory cells of the non-volatile memory device 200 may be configured for example as a Single Level Cell (SLC) storing one data bit, a Multi-Level Cell (MLC) storing two data bits, a Triple Level Cell (TLC) storing three data bits, or a Quadruple Level Cell (QLC) storing four data bits.

In one embodiment, the address decoding circuit 220, the voltage generating circuit 230, the page buffer circuit 240, and the I/O circuit 250 may be commonly designated as a peripheral circuit. The peripheral circuit may drive the memory cell array 210 under the control of the control logic circuit 260.

The address decoding circuit 220 may operate under the control of the control logic circuit 260. The address decoding circuit 220 may receive an address ADDR from the control logic circuit 260. The address decoding circuit 220 may decode a block address in the received address ADDR. The address decoding circuit 220 may select at least one memory block among the plurality of memory blocks according to the decoded block address. The address decoding circuit 220 may decode a row address in the received address ADDR. The address decoding circuit 220 may select at least one word line among word lines of the selected memory block according to the decoded row address. In an embodiment, the address decoding circuit 220 may decode a column address in the received address ADDR. The address decoding circuit 220 may connect the page buffer circuit 240 and the memory cell array 210 to each other according to the decoded column address. Exemplarily, the address decoding circuit 220 may include components such as a row decoder, a column decoder, and an address buffer.

The voltage generating circuit 230 may generate various voltages used for an operation of the non-volatile memory device 200. For example, the voltage generating circuit 230 may generate various voltages such as for example a plurality of program voltages, a plurality of pass voltages, a plurality of verify voltages, a plurality of select read voltages, a plurality of unselect read voltages, a plurality of erase voltages, and a plurality of erase verify voltages, based on a power voltage VCC.

The page buffer circuit 240 may be connected to the memory cell array 210 through the bit lines BLs. The page buffer circuit 240 may sense a voltage change of the bit lines BLs, to read data stored in the memory cell array and to temporarily store the read data. The page buffer circuit 240 may receive data from the I/O circuit 250 and control the bit lines BLs, based on the received data, to store data in the memory cell array 210.

The I/O circuit 250 may exchange data DATA with the storage controller 100. For example, the I/O circuit 250 may receive data DATA from the storage controller, and transfer the received data DATA to the page buffer circuit 240. The I/O circuit 250 may receive data DATA from the page buffer circuit 240, and transfer the received data DATA to the storage controller.

The control logic circuit 260 may control a general operation of the non-volatile memory device 200. For example, the control logic circuit 260 may receive a command CMD and an address ADDR from the storage controller 100 and generate control signals in response to the command CMD and the address ADDR, thereby controlling the peripheral circuit.

Figure 4:
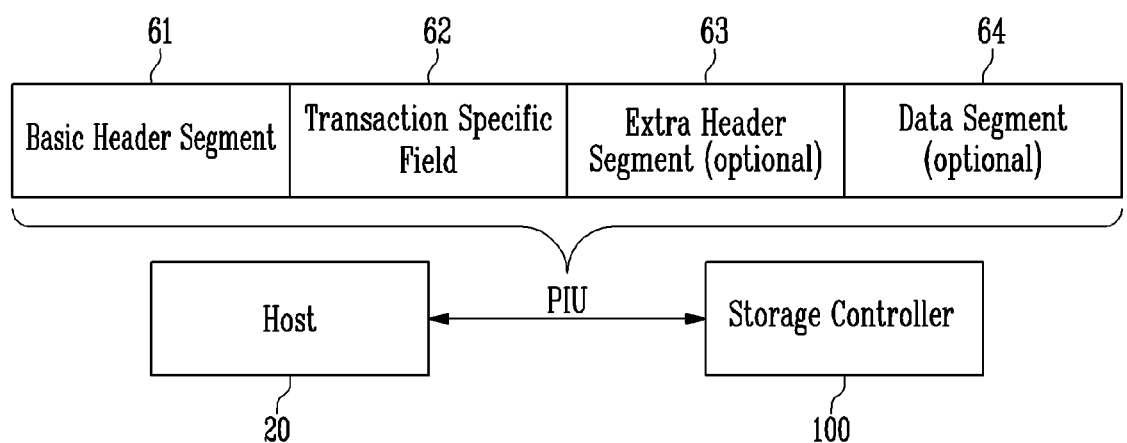
FIG. 4 is a diagram illustrating a structure of a data unit used for communication between a host and the storage controller.

FIG. 4 is a diagram illustrating a structure of a data unit or packet used for communication between the host 20 and the storage controller 100.

Referring to FIGS. 1 and 4, the host 20 and the storage controller 100 may communicate with each other, using data packets referred to as PIUS.

In terms of a physical device, the storage controller 100 is included in the storage device 10. In terms of interfacing between the storage device 10 and the host device 20, any one device may transmit a PIU to another device. A device generating a PIU may be referred to as an initiator device, and a device receiving the generated PIU may be referred to as a target device. That is, the PIU is not a data packet which any one of the storage device 10 and the host 20 unilaterally transmit to the other device but may be a data packet transmitted between the two devices.

The PIU may include a command PIU, a response PIU, a data out PIU, a data in PIU, a ready to transfer PIU, a mode sense PIU, a mode select PIU, a read buffer PIU, and a write buffer PIU according to an operation to be performed by the host 20 or the storage controller 100.

The command PIU may be a PIU transmitted when the host 20 transfers a command to the storage device 10.

The response PIU may be a PIU transmitted when the storage device 10 provides a response to a command provided by the host 20.

The data out PIU may be a PIU transmitted when the host 20 provides data to the storage device 10.

The data in PIU may be a PIU transmitted when the storage device 10 provides data to the host 20.

The ready to transfer PIU may be a PIU transmitted when the storage device 10 informs that the storage device 10 has been ready to receive a data out PIU from the host 20. The ready to transfer PIU may be transmitted when the storage device 10 has a sufficient buffer space in which data provided by the host 20 is to be stored.

The mode sense PIU may be a PIU transmitted when the host 20 reads a device medium variable of the storage device 10.

The mode select PIU may be a PIU transmitted when the host 20 sets a device medium variable of the storage device 10.

The read buffer PIU may be a PIU transmitted when the host 20 reads data stored in the storage device 10.

The write buffer PIU may be a PIU transmitted when the host 20 stores data in the storage device 10.

In some embodiments, the PIU may include a merge PIU. The merge PIU may be a PIU in which separate PIUs are merged using an EHS

FIELD

The smallest size of the PIU may be 32 bytes, and a maximum size of the PIU may be 65,600 bytes. The format of the PIU may have different sizes according to a type thereof.

The PIU may include a basic header segment 61, a transaction specific field 62, an extra header segment 63, and a data segment 64. The basic header segment 61 may have a size of 12 bytes. A basic header segment as used herein refers to a header segment commonly included in PIUs transmitted/received between the storage medium and external devices to the storage medium.

The transaction specific field 62 may be included in a byte address 31 from a byte address 12 of the PIU. The transaction specific field 62 may include a dedicated transaction code according to the type of the PIU. In the case of the transaction specific field 62, the transaction specific field 62 may include a plurality of command descriptor blocks (CDBs). The CDB may include information on various command and various addresses according to a kind thereof. The CDB may be based on various communication schemes such as for example one or more of a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The mode sense PIU and the mode select PIU may include different CDBs. Accordingly, the host 20 is to separately transmit the mode sense PIU and the mode select PIU for the purpose of a select operation and a sense operation of the storage device 10.

In addition, since the mode sense PIU does not include any device medium variable, a data in PIU including a device medium variable may be required separately from the mode sense PIU for the purpose of the sense operation. Since the mode sense PIU does not include any device medium variable, a data out PIU including a device medium variable may be required separately from the mode sense PIU for the purpose of the select operation.

For example, in the case of the select operation of the storage device 10, the host 20 may transmit a mode select PIU to the storage device 10. The storage device 10 may transmit a ready to transfer PIU to the host 20 in response to the mode select PIU. The host 20 may transmit a data out PIU including a device medium variable to the storage device 10 in response to the ready to transfer PIU. The storage device 10 may store the device medium variable and transmit, to the host 20, a PIU responding to the mode select PIU in response to the data out PIU. That is, in the case of the select operation of the storage device 10, four PIUs may be required.

In the case of the sense operation of the storage device 10, the host 20 may transmit a mode sense PIU to the storage device 10. The storage device 10 may transmit a data in PIU including a device medium variable to the host 20 in response to the mode sense PIU. The storage device 10 may transmit, to the host 20, a PIU responding to the mode sense PIU, based on that the storage device 10 transmits the data in PIU to the host 20. That is, in the case of the sense operation of the storage device 10, three PIUs may be required.

Since the mode select PIU and the mode sense PIU include different CDBs, the select operation and the sense operation may not be simultaneously processed, and the sense operation may be performed after performing the select operation. In addition, since the mode select PIU and the mode select PIU do not include any device medium variable, the data in PIU and the data out PIU are used. Accordingly, seven PIUs (i.e., four PIUs for the selection operation and three PIUs for the sense operation) may be required to perform both the select operation and the sense operation.

The extra header segment 63 may be defined when a total extra header segment length (Total EHS Length) field of the basic header segment 61 has a value which is not 0. The extra header segment 63 may start from a byte address 32 of the PIU. The extra header segment 63 may be an area capable of additionally storing data when sufficient information is not included in the basic header segment 61.

In some embodiments, the host 20 may allow a merge message to be included in the extra header segment 63, and transfer the PIU including the extra header segment 63 to the storage device 10. Specifically, the host 20 and the storage device 10 may set a total extra header segment length (Total EHS Length) field included in the basic header segment 61 of the PIU transmitted/received therebetween to a value which is not 0, and allow a merge message to be included in the extra header segment 63 and then transmit the PIU including the extra header segment 63.

Since a merge message including a device medium variable is included in the extra header segment 63 to transmit the PIU including the extra header segment 63, it is unnecessary to transmit the device medium variable through the data in PIU or the data out PIU, unlike a case where the mode select PIU and the mode sense PIU are used.

Since the existing mode select PIU and the existing mode select PIU include different CDB, the mode sense PIU and the mode select PIU are separately transmitted for the purpose of the select operation and the sense operation of the storage device 10. On the other hand, in the present disclosure, since a merge message including a first merge type is included in the extra header segment 63 to transmit the PIU including the extra header segment 63, the mode sense PIU and the mode select PIU are not separately transmitted, and the select operation and the sense operation can be performed using one PIU.

That is, when a merge PIU including a merge message is used, the number of transmitted/received PIUs is small as compared with a case where the mode select PIU and the mode sense PIU are used. Therefore, the select operation and the sense operation can be performed at a relatively higher speed. The merge message will be described in detail later with reference to FIG. 6.

The data segment 64 may be included in the data out PIU or the data in PIU, and may not be included in the other PIUs.

Figure 5:
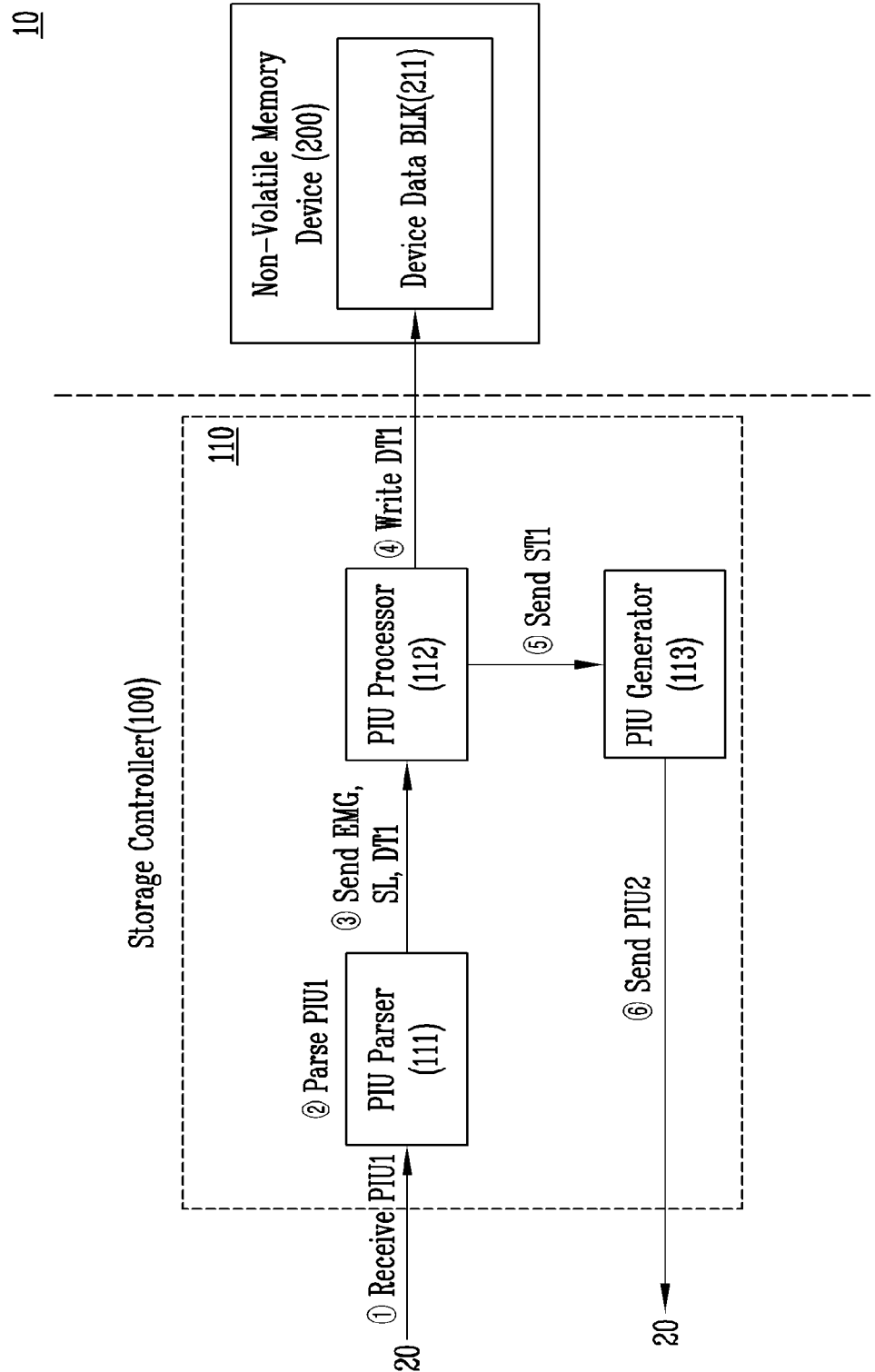
FIG. 5 is a diagram illustrating a select operation in accordance with another embodiment of the present disclosure.

FIG. 5 is a diagram illustrating a select operation in accordance with an embodiment of the present disclosure.

FIG. 5 illustrates a select operation in which the storage device 10 stores a first device medium variable DT1 in the non-volatile memory device 200. The storage controller 100 may include a device data block management module 110. The device data block management module 110 may include a PIU parser 111, a PIU processor 112, and a PIU generator 113. The PIU parser 111, the PIU processor 112, and the PIU generator 113 may respectively correspond to the PIU parser 111, the PIU processor 112, and the PIU generator 113, which are shown in FIG. 2.

Hereinafter, in some embodiments of the present disclosure, an operating method of the storage device 10 performing the select operation is described. An EHS type may be a merge EHS type. An EHS sub-type may be a select type.

In a first operation ①, the PIU parser 111 may receive a first PIU PIU1 from the host 20. The first PIU PIU1 may include a first merge message.

In a second operation ②, the PIU parser 111 may acquire the first merge message by parsing the first PIU PIU1. The PIU parser 111 may acquire a merge EHS type EMG, an EHS sub-type, and a device medium variable by parsing the first merge message. For example, the PIU parser 111 may acquire the EHS type EMG, a select type SL, the first device medium variable DT1 from the first PIU PIU1.

In a third operation ③, the PIU parser 111 may transmit (send) the merge EHS type EMG, the select type SL, and the first device medium variable DT1 to the PIU processor 112.

In a fourth operation ④, the PIU processor 112 may write the first device medium variable DT1 in a device data block 211 included in the non-volatile memory device 200. That is, the PIU processor 112 may store the first device medium variable DT1 received from the host 20 in the device data block 211.

In a fifth operation ⑤, the PIU processor 112 may transmit, to the PIU generator 113, first status data ST1 indicating that the select operation has succeeded.

In a sixth operation ⑥, the PIU generator 113 may transmit, to the host 20, a second PIU PIU2 including a second merge message. The PIU generator 113 may generate the second merge message including the merge EHS type EMG, the select type SL, and the first status data ST1. The PIU generator 113 may generate the second PIU PIU2 including the second merge message.

When the select operation of the storage device 10 is performed through the mode select PIU, four PIUs may be used. On the other hand, when the select operation of the storage device 10 is performed through the merge PIU, merely two PIUs may be used. The probability that an error will occur due to PIUs can be reduced as the number of used PIUs decreases, and the select operation can be performed at relatively higher speeds as the number of flows decreases.

In some embodiments, the PIU parser 111 may acquire the merge EHS type EMG, a write type, and first data by parsing the first merge message. When the first PIU PIU1 includes the write type as the EHS sub-type, the storage controller 100 may perform a write operation. The first data may be normal data.

The PIU processor 112 may write the first data in a normal data block included in the non-volatile memory device 200.

The PIU processor 112 may transmit, to the PIU generator 113, status data indicating that the write operation has succeeded. The PIU generator 113 may transmit the second PIU PIU2 including the second merge message to the host 20. The PIU generator 113 may generate the second merge data including the merge EHS type EMG, the write type, and the status data. The PIU generator 113 may generate the second PIU PIU2 including the second merge message.

FIG. 6 is a diagram illustrating a structure of the extra header segment 63 of the PIU.

Referring to FIG. 6, the extra header segment 63 may include a length field, an EHS type field, an EHS sub-type field, and an EHS data field. For example, the extra header segment 63 may include zeroth to Nth bytes (0 to N).

The zeroth byte (0) of the extra header segment 63 may be the length field. The length field may be a field having a total length of the extra header segment 63. In some embodiments, N may be '32*L−1.' L may be a value stored in the zeroth byte of the extra header segment 63. For example, the length field may have '0x3.'

The first byte (1) of the extra header segment 63 may be the EHS type field. The EHS type field may specify a type of the extra header segment 63. In some embodiments, when the EHS type field includes the merge EHS type, the zeroth to Nth bytes (0 to N) of the extra header segment 63 may be designated as the merge message.

In some embodiments, when the EHS type field includes the merge EHS type, a merge PIU may be a PIU in which separate PIUs are merged. For example, in the case of a merge PIU in which the mode select PIU and the mode sense PIU are merged, the EHS type field may have '0x03 h.' In the case of a merge PIU in which the read buffer PIU and the write buffer PIU are merged, the EHS type field may have '0x04 h.'

The second and third bytes (2 and 3) of the extra header segment 63 may be the EHS sub-type field. When the EHS type field includes the merge EHS type, the EHS sub-type field may include one of a select type, a sense type, a first merge type, a write type, a read type, and a second merge type.

The fourth to Nth bytes (4 to N) of the extra header segment 63 may be the EHS data field. When the EHS sub-type field is one of the select type, the sense type, and the first merge type, the EHS data field may include a device medium variable. When the EHS sub-type field is one of the write type, the read type, and the second merge type, the EHS data field may include normal data.

Figure 7:
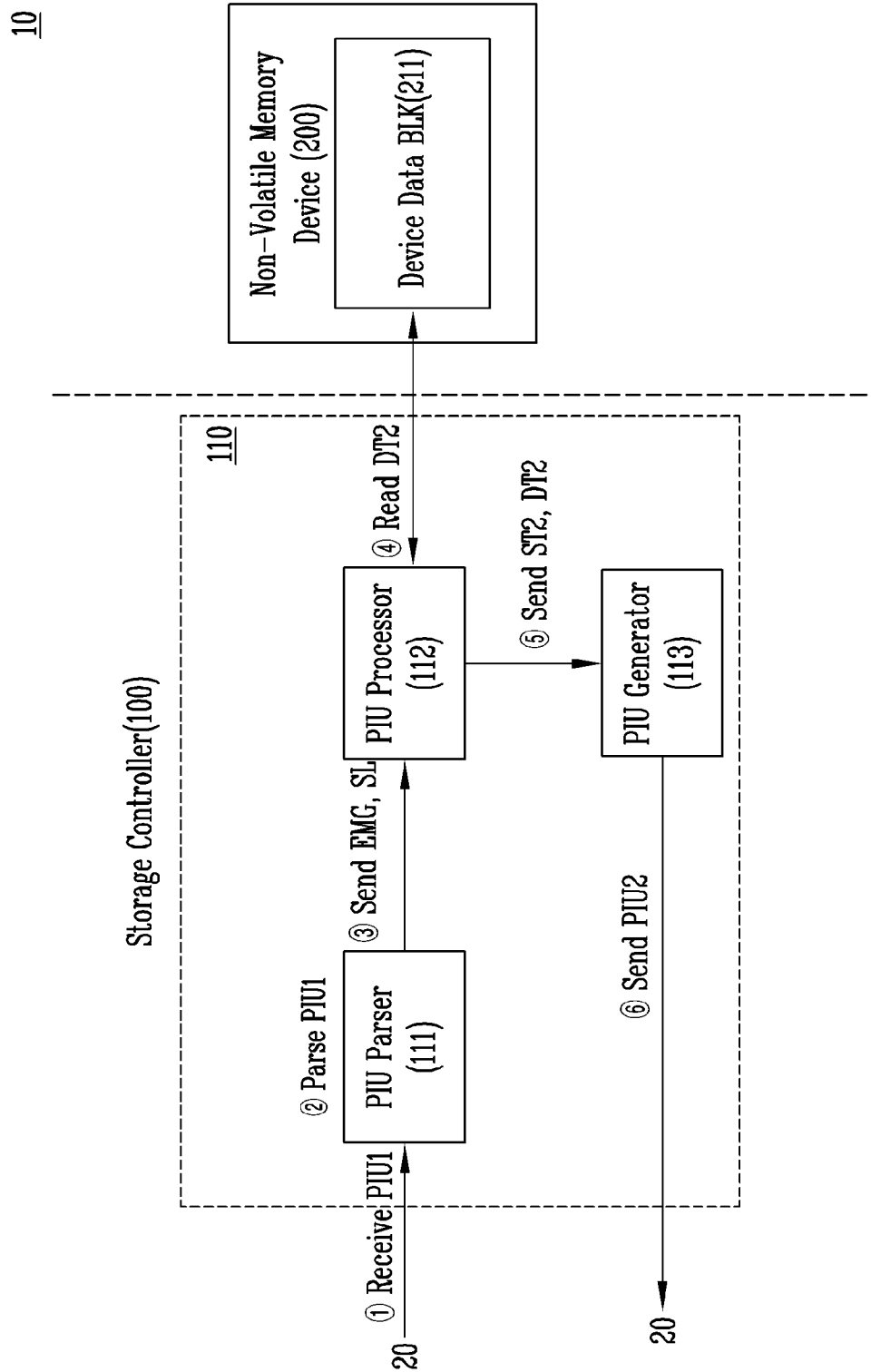
FIG. 7 is a diagram illustrating a sense operation in accordance with another embodiment of the present disclosure.

FIG. 7 is a diagram illustrating a sense operation in accordance with one embodiment of the present disclosure.

FIG. 7 illustrates a sense operation in which the storage device 10 reads a second device medium variable DT2 stored in the non-volatile memory device 200. The storage controller 100 may include a device data block management module 110. The device data block management module 110 may include a PIU parser 111, a PIU processor 112, and a PIU generator 113. The PIU parser 111, the PIU processor 112, and the PIU generator 113 may respectively correspond to the PIU parser 111, the PIU processor 112, and the PIU generator 113, which are shown in FIG. 2.

Referring to the non-volatile memory device 200 shown in FIG. 7, the device data block 211 storing the second device medium variable DT2 is illustrated. Hereinafter, in some embodiments of the present disclosure, an operating method of the storage device 10 performing the sense operation is described. An EHS type may be a merge EHS type. An EHS sub-type may be a sense type.

In a first operation ①, the PIU parser 111 may receive a first PIU PIU1 from the host 20. The first PIU PIU1 may include a first merge message.

In a second operation ②, the PIU parser 111 may acquire the first merge message by parsing the first PIU PIU1. The PIU parser 111 may acquire a merge EHS type EMG and an EHS sub-type by parsing the first merge message. For example, the PIU parser 111 may acquire the EHS type EMG and a sense type SN from the first PIU PIU1.

In a third operation ③, the PIU parser 111 may transmit (send) the merge EHS type EMG and the sense type SN to the PIU processor 112.

In a fourth operation ④, the PIU processor 112 may read the second device medium variable DT2 stored in a device data block 211 included in the non-volatile memory device 200. That is, the PIU processor 112 may fetch the second device medium variable DT2 from the device data block 211. In some embodiments, the second device medium variable DT2 read from the device data block 211 may be stored in a cache memory of the storage controller 100. For example, the second device medium variable DT2 read from the device data block 211 may be stored in the volatile memory device 120.

In a fifth operation ⑤, the PIU processor 112 may transmit, to the PIU generator 113, second status data ST2 indicating that the sense operation has succeeded and the second device medium variable DT2.

In a sixth operation ⑥, the PIU generator 113 may transmit, to the host 20, a second PIU PIU2 including a second merge message. The PIU generator 113 may generate the second merge message including the merge EHS type EMG, the sense type SN, the second status data ST2, and the second device medium variable DT2. The PIU generator 113 may generate the second PIU PIU2 including the second merge message.

When the sense operation of the storage device 10 is performed through the mode select PIU, three PIUs may be used. On the other hand, when the sense operation of the storage device 10 is performed through the merge PIU, merely two PIUs may be required. The probability that an error will occur due to PIUs can be reduced as the number of used PIUs decreases, and the sense operation can be performed at relatively higher speeds as the number of flows decreases.

In some embodiments, the PIU parser 111 may acquire the merge EHS type EMG and a read type by parsing the first merge message. When the first PIU PIU1 includes the read type as the EHS sub-type, the storage controller 100 may perform a read operation.

The PIU processor 112 may read second data from a normal data block included in the non-volatile memory device 200. The PIU processor 112 may transmit, to the PIU generator 113, status data indicating that the read operation has succeeded. The PIU generator 113 may transmit the second PIU PIU2 including the second merge message to the host 20. The PIU generator 113 may generate the second merge data including the merge EHS type EMG, the read type, the status data, and the second data. The PIU generator 113 may generate the second PIU PIU2 including the second merge message.

Figure 8:
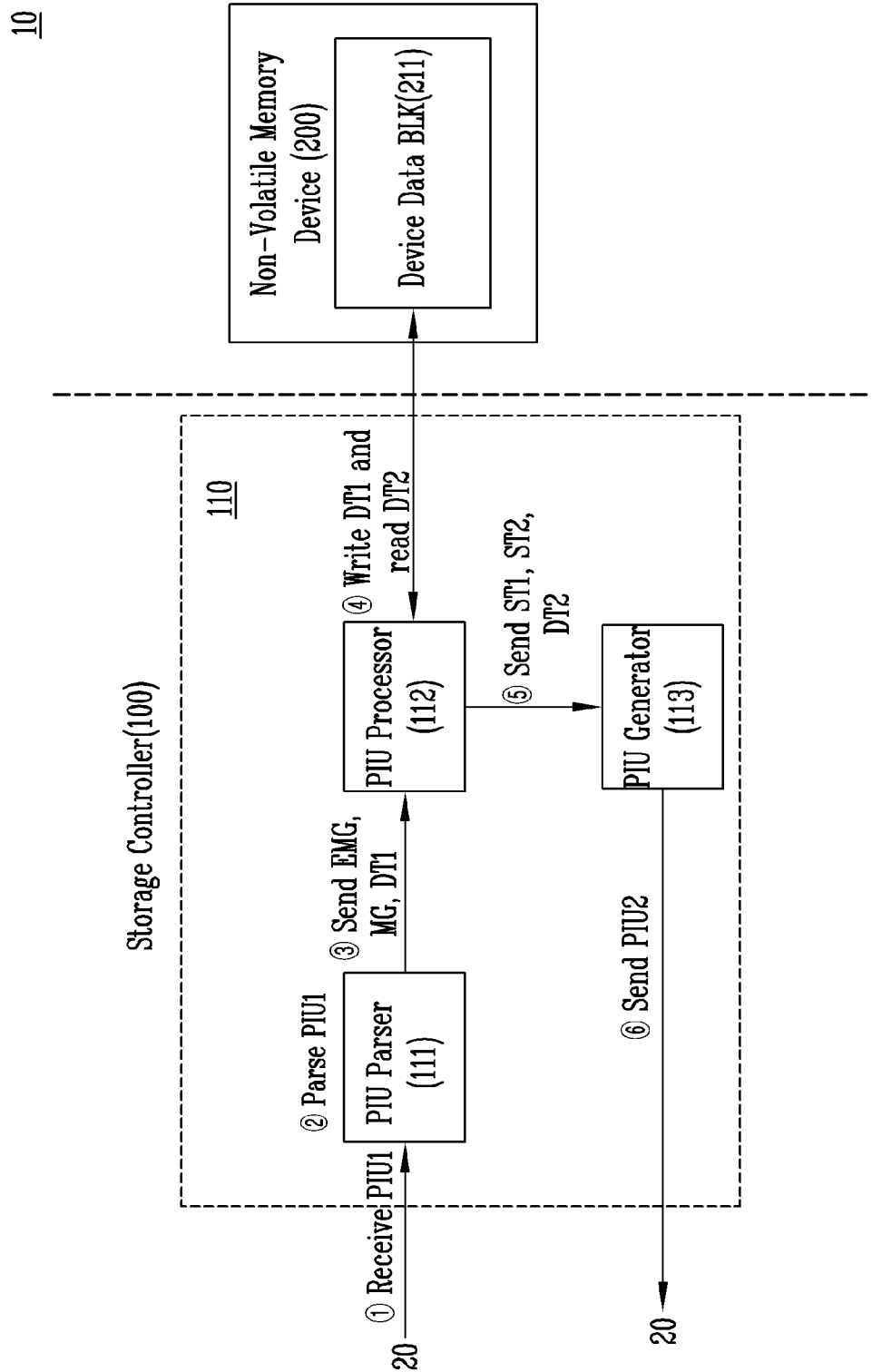
FIG. 8 is a diagram illustrating a merge operation in accordance with another embodiment of the present disclosure.

FIG. 8 is a diagram illustrating a merge operation in accordance with another embodiment of the present disclosure.

FIG. 8 illustrates a select operation in which the storage device 10 stores a first device medium variable DT1 in the non-volatile memory device 200 and a sense operation in which the storage device 10 reads a second device medium variable DT2 stored in the non-volatile memory device 200.

The storage controller 100 may include a device data block management module 110. The device data block management module 110 may include a PIU parser 111, a PIU processor 112, and a PIU generator 113. The PIU parser 111, the PIU processor 112, and the PIU generator 113 may respectively correspond to the PIU parser 111, the PIU processor 112, and the PIU generator 113, which are shown in FIG. 2.

Hereinafter, in some embodiments of the present disclosure, an operating method of the storage device 10 performing a first merge operation is described. An EHS type may be a merge EHS type. An EHS sub-type may be a first merge type.

In a first operation ①, the PIU parser 111 may receive a first PIU PIU1 from the host 20. The first PIU PIU1 may include a first merge message.

In a second operation ②, the PIU parser 111 may acquire the first merge message by parsing the first PIU PIU1. The PIU parser 111 may acquire a merge EHS type EMG, an EHS sub-type, and a device medium variable by parsing the first merge message. For example, the PIU parser 111 may acquire the EHS type EMG, a first merge type MG, and the first device medium variable DT1 from the first PIU PIU1.

In a third operation ③, the PIU parser 111 may transmit (send) the merge EHS type EMG, the first merge type MG, and the first device medium variable DT1 to the PIU processor 112.

In a fourth operation ④, the PIU processor 112 may write the first device medium variable DT1 in a device data block 211 included in the non-volatile memory device 200, and may read the second device medium variable DT2 stored in the device data block 211.

In a fifth operation ⑤, the PIU processor 112 may transmit, to the PIU generator 113, first state data ST1 indicating that the select operation has succeeded, second status data ST2 indicating that the sense operation has succeeded, and the second device medium variable DT2.

In some embodiments, when the select operation fails and the sense operation succeeds, the PIU processor 112 may transmit, to the PIU generator 113, the first state data ST1 indicating that the select operation has failed, the second status data ST2 indicating that the sense operation has succeeded, and the second device medium variable DT2. When the select operation succeeds and the sense operation fails, the PIU processor 112 may transmit, to the PIU generator 113, the first state data ST1 indicating that the select operation has succeeded and the second status data ST2 indicating that the sense operation has failed.

In a sixth operation ⑥, the PIU generator 113 may transmit, to the host 20, a second PIU PIU2 including a second merge message. The PIU generator 113 may generate the second merge message including the merge EHS type EMG, the first merge type MG, the first status data ST1, the second status data ST2, and the second device medium variable DT2. The PIU generator 113 may generate the second PIU PIU2 including the second merge message.

When the mode select PIU and the mode sense PIU are used to perform the select operation and the sense operation, seven PIUs (i.e., four PIUs for the selection operation and three PIUs for the sense operation) may be used. On the other hand, when the first merge operation is performed through the merge PIU, two PIUs may be used. Thus, the probability that an error will occur due to PIUs can be reduced as the number of used PIUs decreases, and the select operation and the sense operation can be performed at relatively higher speeds as the number of flows decreases.

In some embodiments, the PIU parser 111 may acquire the merge EHS type EMG, first data, and a second merge type by parsing the first merge message. When the first PIU PIU1 includes the second merge type as the EHS sub-type, the storage controller 100 may perform a read operation and a write operation.

The PIU processor 112 may write the first data in a normal data block included in the non-volatile memory device 200. The PIU processor 112 may transmit, to the PIU generator 113, status data indicating that the write operation has succeeded. The PIU processor 112 may read second data from a normal data block included in the non-volatile memory device 200. The PIU processor 112 may transmit, to the PIU generator 113, status data indicating that the read operation has succeeded. The PIU generator 113 may generate a second merge EHS type, the second merge type, the status data indicating that the write operation has succeeded, the status data indicating that the read operation has succeeded, and the second merge message including the second data. The PIU generator 113 may generate the second PIU PIU2 including the second merge message.

Figure 9:
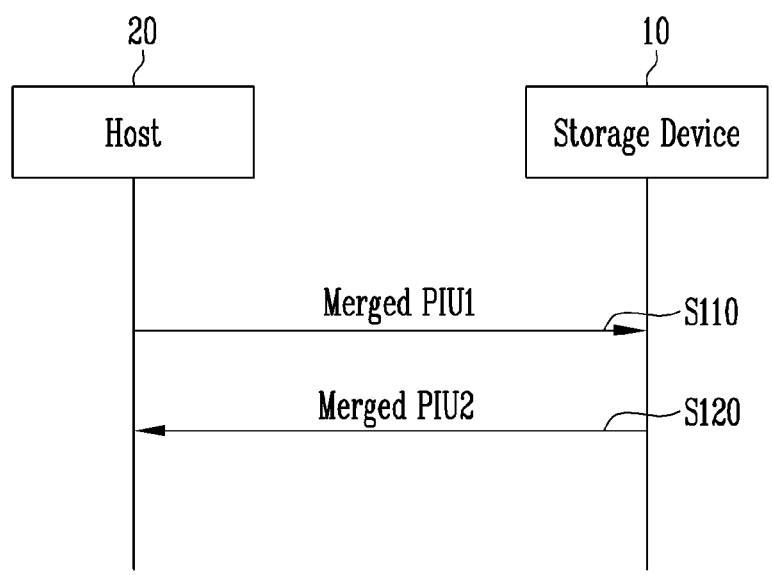
FIG. 9 is a sequence diagram illustrating an operating method of the storage system in accordance with one embodiment of the present disclosure.

FIG. 9 is a sequence diagram illustrating an operating method of the storage system in accordance with another embodiment of the present disclosure.

FIG. 9 illustrates a case where the host 20 transmits a first merge PIU to the storage device 10 and the storage device 10 transmits a second merge PIU to the host 20. The storage device 10 may include the storage controller 100 shown in FIG. 2.

In operation S110, the host 20 may transmit a first merge PIU including a first merge message to the storage device 10. The first merge message may include a merge EHS type and an EHS sub-type. The storage device 10 may perform at least one of a select operation and a sense operation according to the EHS sub-type of the first merge message. In some embodiments, the storage device 10 may perform the select operation when the EHS type is a select type, perform the sense operation when the EHS sub-type is a sense type, and perform a first merge operation when the EHS sub-type is a first merge type. The storage device 10 may perform a write operation when the EHS sub-type is a write type, perform a read operation when the EHS sub-type is a read type, and perform both the write operation and the read operation when the EHS sub-type is a second merge type.

In operation S120, the storage device 10 may transmit a second merge PIU including a second merge message to the host 20. In some embodiments, when the storage device 10 performs the select operation, the second merge message may be generated, which includes the EHS merge type, the select type, and status data indicating that the select operation has succeeded. When the storage device 10 performs the sense operation, the second merge message may be generated, which includes the EHS merge type, the sense type, status data indicating that the sense operation has succeeded, and device medium data stored in the storage device. When the storage device 10 performs the first merge operation, the second merge message may be generated, which includes the EHS merge type, the first merge type, the status data indicating that the select operation has succeeded, the status data indicating that the sense operation has succeeded, and the device medium data stored in the storage device 10.

In addition, when the storage device 10 performs the write operation, the second merge message may be generated, which includes the EHS merge type, the write type, and status data indicating that the write operation has succeeded.

When the storage device 10 performs the read operation, the second merge message may be generated, which includes the EHS merge type, the read type, status data indicating that the read operation has succeeded, and normal data stored in the storage device 10. When the storage device 10 performs a second merge operation, the second merge message may be generated, which includes the EHS merge type, the second merge type, the status data indicating that the write operation has succeeded, the status data indicating that the read operation has succeeded, and the normal data stored in the storage device 10.

Figure 10:
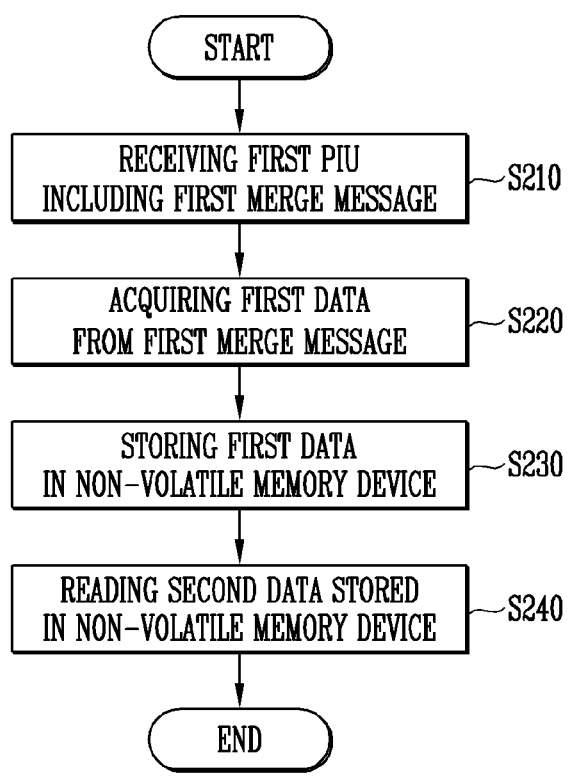
FIG. 10 is a flowchart illustrating an operating method of the storage controller in accordance with another embodiment of the present disclosure.

FIG. 10 is a flowchart illustrating an operating method of the storage controller 100 in accordance with an embodiment of the present disclosure.

FIG. 10, illustrates a case where the storage controller 100 performs a first merge operation and a second merge operation.

In operation S210, the storage controller 100 may receive a first PIU including a first merge message from the host 20. The first merge message may include a merge EHS type. The first merge message may include a first merge type or a second merge type.

In operation S220, the storage controller 100 may acquire first data from the first merge message. The first data may be a device medium variable or normal data.

In operation S230, the storage controller 100 may store the first data received from the host 20 in the non-volatile memory device 200.

In operation S240, the storage controller 100 may read second data stored in the non-volatile memory device 200. The second data may be a device medium variable or normal data.

Although a case where the storage controller 100 stores the first data and then reads the second data is illustrated, the present disclosure is not limited thereto, and the storage controller 100 may read the second data and then store the first data.

In some embodiments, the storage controller 100 may generate a second merge message including the merge EHS type, first status data indicating that an operation of storing the first data has succeeded, second status data indicating that an operation of reading the second data has succeeded, and the second data. The storage controller 100 may output a second PIU including the second merge message to the host 20.

In accordance with the present disclosure, there can be provided a storage device processing a command in which separate commands are merged. In accordance with the present disclosure, as a plurality of protocol information units configured in a pair are merged as one protocol information unit, the number of protocol information unit transfer flows can be decreased, and the processing speed of an operation using the plurality of protocol information units configured in the pair can be increased.

While the present disclosure has been shown and described with reference to certain embodiments thereof, it will be understood by those skilled in the art that various changes in form and details may be made therein without departing from the scope of the present disclosure and any equivalents. Therefore, the scope of the present disclosure should not be limited to the above-described embodiments but should include the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Meanwhile, the embodiments of the present disclosure have been described in the drawings and specification. Although specific terminologies are used here, those are only to explain the embodiments of the present disclosure. Therefore, the present disclosure is not restricted to the above-described embodiments and many variations are possible within the scope of the present disclosure. It should be apparent to those skilled in the art that various modifications can be made on the basis of the technological scope of the present disclosure in addition to the embodiments disclosed herein.

What is claimed is:

1. A storage device comprising:
a non-volatile memory device; and
a storage controller configured to receive a first Protocol Information unit (PIU) including a first merge message from an external device, and perform, based on the first PIU, at least one of a sense operation of reading first data stored in a memory block of the non-volatile memory device and a select operation of storing, in the memory block, second data received from the external device,
wherein the first PIU includes:
a basic header segment; and
a first Extra Header Segment (EHS) including the first merge message.

2. The storage device of claim 1, wherein the first merge message includes one of a sense type, a select type, and a merge type,
wherein, when the first merge message includes the select type, the storage controller is configured to perform the select operation,
wherein, when the first merge message includes the sense type, the storage controller is configured to perform the sense operation, and
wherein, when the first merge message includes the merge type, the storage controller is configured to perform both the select operation and the sense operation.

3. The storage device of claim 2,
wherein, when the first merge message includes the select type, the storage controller is configured to store the first data in the memory block, and
wherein the first data includes a device medium variable received from the external device.

4. The storage device of claim 2,
wherein, when the first merge message includes the sense type, the storage controller is configured to read the second data stored in the memory block, and
wherein the second data includes a device medium variable of the non-volatile memory device.

5. The storage device of claim 2,
wherein, when the first merge message includes the merge type, the storage controller is configured to store the first data in the memory block and reads the second data stored in the memory block,
wherein the first data includes a device medium variable received from the external device, and
wherein the second data includes a device medium variable of the non-volatile memory device.

6. The storage device of claim 2,
wherein the first merge message includes a length field, an EHS type field, an EHS sub-type field, and a data type field,
wherein the length field includes a length of the first EHS,
wherein the EHS type field includes a merge EHS type,
wherein the EHS sub-type field includes one of the select type, the sense type, and the merge type, and
wherein the data type field includes the first data.

7. The storage device of claim 2,
wherein the storage controller is configured to generate a second PIU including a second merge message according to the first merge message including the select type, and
wherein, when the select operation of the storage controller succeeds, the second merge message includes the select type and second status data indicating that the select operation has succeeded.

8. The storage device of claim 2,
wherein the storage controller is configured to generate a second PIU including a second merge message according to the first merge message including the sense type, and
wherein, when the sense operation of the storage controller succeeds, the second merge message includes the sense type, first status data indicating that the sense operation has succeeded, and the second data.

9. The storage device of claim 2,
wherein the storage controller is configured to generate a second PIU including a second merge message according to the first merge message including the merge type, and
wherein, when the select operation and the sense operation of the storage controller succeed, the second merge message includes the merge type, first status data indicating that the sense operation has succeeded, second status data indicating that the select operation has succeeded, and the second data.

10. The storage device of claim 1, wherein the basic header segment includes a total extra header segment length field having a value which is not 0.

11. The storage device of claim 1,
wherein the memory block is configured to store a device medium variable of the non-volatile memory device, which sets a recording mode of the non-volatile memory device.

12. A method of operating a storage controller, the method comprising:
receiving a first Protocol Information Unit (PIU) including a first merge message from an external device;
acquiring first data from the first merge message;
storing, in a non-volatile memory device, the first data received from the external device; and
reading second data stored in the non-volatile memory device,
wherein the first merge message includes a merge Extra Header Segment (EHS) type.

13. The method of claim 12, further comprising:
generating a second merge message including the merge EHS type, first status data indicating that an operation of storing the first data has succeeded, second status data indicating that an operation of reading the second data has succeeded, and the second data; and
transmitting a second PIU including the second merge message to the external device.

14. The method of claim 12, wherein the first data and the second data set a recording mode of the non-volatile memory device.

15. The method of claim 12,
wherein the first merge message includes a length field, an EHS type field, an EHS sub-type field, and a data type field,
wherein the length field includes a length of the first merge message,
wherein the EHS type field includes the merge EHS type,
wherein the EHS sub-type field includes a merge type, and
wherein the data type field includes the first data.

16. A storage device comprising:
a non-volatile memory device including at least a device data block; and
a storage controller including:
a Protocol Information unit (PIU) parser configured to receive, from an external device, a first PIU including a first merge message as a first Extra Header Segment (EHS), and acquire the first merge message by parsing the received first PIU;
a PIU processor configured to perform, based on the first PIU, a sense operation of reading first data stored in a device data block of the non-volatile memory device, a select operation of storing, in the device data block, second data received from the external device, or both the select operation and the sense operation; and
a PIU generator configured to generate a second merge message according to the first merge message, and transmit a second PIU including the second merge message to the external device, wherein the second merge message includes a merge EHS type, first status data indicating that the select operation has succeeded, second status data indicating that the sense operation has succeeded, and the second data.

17. The storage device of claim 16, wherein the first data and the second data set a recording mode of the non-volatile memory device.

* * * * *